(No Model.)
J. MORNINGSTAR.
MECHANICAL MOVEMENT.
No. 450,914. Patented Apr. 21, 1891.
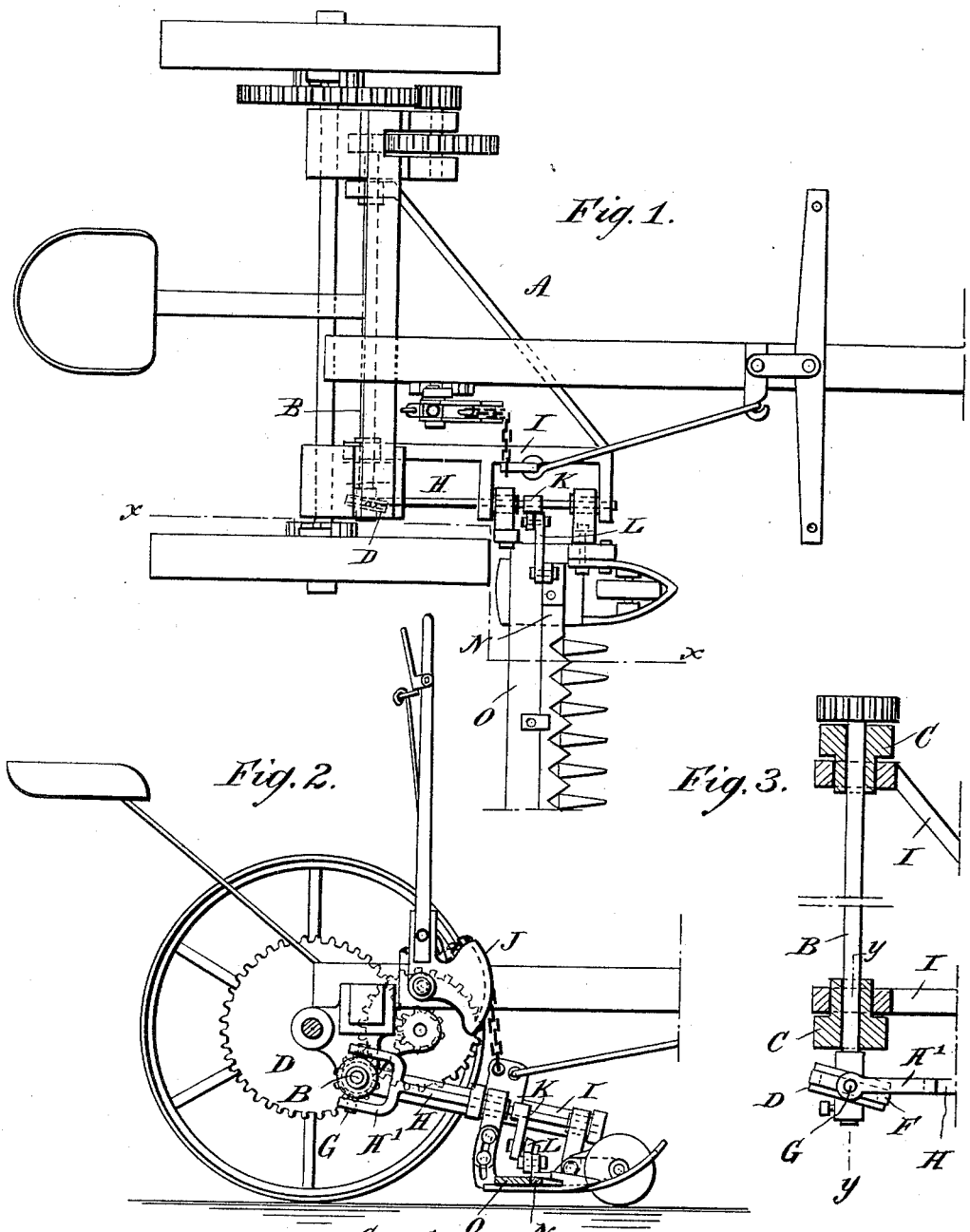
WITNESSES:
Donn Twitchell
C. Sedgwick
INVENTOR:
J. Morningstar
BY
Munn & Co.
ATTORNEYS

UNITED STATES PATENT OFFICE.

JESSE MORNINGSTAR, OF ARCHBOLD, OHIO.

MECHANICAL MOVEMENT.

SPECIFICATION forming part of Letters Patent No. 450,914, dated April 21, 1891.

Application filed November 6, 1890. Serial No. 370,485. (No model.)

*To all whom it may concern:*

Be it known that I, JESSE MORNINGSTAR, of Archbold, in the county of Fulton and State of Ohio, have invented a new and Improved Mechanical Movement, of which the following is a full, clear, and exact description.

The object of the invention is to provide a new and improved mechanical movement which is simple and durable in construction, very effective in operation, and designed for use on various machines, and especially to convert the rotary motion of the main driving-shaft of a mower into a reciprocating motion to actuate the knives.

The invention consists of a cam-wheel adapted to be driven, a circular strap held on the said cam-wheel and provided with trunnions, and a shaft mounted to turn and provided with a forked end engaged by the said trunnions, the said shaft being adapted to carry a crank-arm to connect with the device to be driven.

The invention also consists of certain parts and details and combinations of parts, as will be hereinafter more fully described, and then pointed out in the claims.

Reference is to be had to the accompanying drawings, forming a part of this specification, in which similar letters of reference indicate corresponding parts in all the figures.

Figure 1 is a plan view of the improvement as applied to a mowing-machine. Fig. 2 is a sectional side elevation of the same on the line $x\,x$ of Fig. 1. Fig. 3 is an enlarged sectional plan view of part of the improvement. Fig. 4 is a transverse section of the cam-wheel and its connections on the line $y\,y$ of Fig. 3, and Fig. 5 is a sectional view showing the connection of the crank-arm with the knife-bar.

The mechanical movement, as illustrated in the drawings, is applied to a mowing-machine A, having a shaft B, mounted to turn in suitable bearings C, carried by the frame of the machine. The shaft B is driven in the usual manner by one of the side wheels of the mower.

At one end of the shaft B is secured a cam-wheel D, set at angles to the said shaft and provided in its rim with a circular groove E, engaged by a correspondingly-shaped strap F, provided with diametrically-arranged trunnions G, engaged by the arms of a fork H', formed at one end of the shaft H, mounted to turn in suitable bearings and held on the frame I, pivoted on the bearings C, previously mentioned. The frame I is adapted to be raised and lowered, being connected with the usual lifting device J under the control of the operator, the said frame swinging from the shaft B as a center.

On the shaft H is secured a crank-arm K, connected by a link L with the usual knife-bar N, mounted to slide transversely in the knife-frame O, pivoted on the shaft H. When not in use, the knife-frame O is swung into a vertical position, turning on the shaft H as a center of motion. The latter, with the knife-frame, can then be raised off of the ground by the lifting device J. When the machine is moved forward a rotary movement is imparted to the shaft B, which, by the angularly-set cam D, causes a turning of the shaft H on account of the fork H' of the latter being engaged by the trunnions G of the strap F. It is understood that when the cam D rotates the strap F continually changes its position forward and backward, rocking sidewise from a point in the axis of the shaft B at the intersection of the axis of the shaft H. This rocking motion of the strap causes a similar rocking of the shaft H, so that the crank-arm K is moved laterally, thereby imparting a reciprocating motion to the knife-bar N.

The mechanical movement is more specially adapted for mowers and reapers, as shown and described; but with a few modifications it can be readily adapted for other purposes.

Having thus fully described my invention, I claim as new and desire to secure by Letters Patent—

1. In a mechanical movement, the combination, with the drive-shaft having a circular peripherally-grooved cam-wheel thereon at an angle thereto, a circular strap in said groove, the rock-shaft at an angle to the drive-shaft and having a fork at its rear end pivoted to opposite sides of the strap, and a crank-arm near the opposite end of said rock-shaft, of the reciprocating cutter-bar and a link connecting it with said crank-arm, substantially as set forth.

2. In a mechanical movement, the combination, with a driving-shaft, of a circular cam-wheel secured on the said driving-shaft and set at angles thereto, a circular strap engaging a cam-groove in the rim of the said wheel, trunnions formed diametrically opposite each other on the said strap, a shaft mounted to turn and provided with a fork engaging the said trunnions, and a frame in which the said second-named shaft is mounted to turn, said frame being pivoted on the first-named shaft, substantially as shown and described.

3. In a mechanical movement, the combination, with a driving-shaft, of a circular cam-wheel secured on the said driving-shaft and set at angles thereto, a circular strap engaging a cam-groove in the rim of the said wheel, trunnions formed diametrically opposite each other on the said strap, a shaft mounted to turn and provided with a fork engaging the said trunnions, a frame in which the said second-named shaft is mounted to turn, said frame being pivoted on the first-named shaft, a knife-frame fulcrumed on the said second-named shaft and provided with a knife-bar, and a crank-arm held on the said second-named shaft and pivotally-connected with the said knife-bar, substantially as shown and described.

JESSE MORNINGSTAR.

Witnesses:
L. M. MURPHY,
J. S. SAMS.